US007852520B2

(12) United States Patent
Iida

(10) Patent No.: US 7,852,520 B2
(45) Date of Patent: Dec. 14, 2010

(54) SCANNER CONTROL DEVICE AND SCANNER DEVICE

(75) Inventor: Masahiro Iida, Kyoto (JP)

(73) Assignee: MURATA Kikai Kabushiki Kaisha, Kyoto-shi (JP)

( * ) Notice: Subject to any disclaimer, the term of this patent is extended or adjusted under 35 U.S.C. 154(b) by 938 days.

(21) Appl. No.: 11/723,505

(22) Filed: Mar. 20, 2007

(65) Prior Publication Data

US 2007/0229915 A1 Oct. 4, 2007

(30) Foreign Application Priority Data

Mar. 30, 2006 (JP) ............................. 2006-094250

(51) Int. Cl.
*H04N 1/04* (2006.01)
(52) U.S. Cl. ..................... 358/474; 358/488; 358/505; 399/367; 382/190; 382/100
(58) Field of Classification Search ................ 358/474, 358/488, 497, 496, 486; 382/190, 100, 296, 382/289, 173, 182; 399/367, 82, 85, 81
See application file for complete search history.

(56) References Cited

U.S. PATENT DOCUMENTS

| 6,222,545 | B1 * | 4/2001 | Suzuki et al. ............... 345/418 |
| 6,236,415 | B1 * | 5/2001 | Nozaki et al. ............... 347/116 |
| 6,748,185 | B2 * | 6/2004 | Song .......................... 399/81 |
| 6,842,265 | B1 * | 1/2005 | Votipka et al. ............. 358/1.16 |
| 7,394,578 | B2 * | 7/2008 | Itoh .......................... 358/474 |
| 2001/0014183 | A1 * | 8/2001 | Sansom-Wai et al. ....... 382/289 |
| 2003/0086720 | A1 * | 5/2003 | Song .......................... 399/81 |
| 2004/0252318 | A1 | 12/2004 | Kuroda et al. |
| 2004/0264807 | A1 * | 12/2004 | Yakhini et al. .............. 382/289 |
| 2005/0251016 | A1 * | 11/2005 | Chuang ...................... 600/407 |
| 2006/0103877 | A1 * | 5/2006 | Lee et al. .................... 358/1.15 |
| 2007/0236555 | A1 * | 10/2007 | Kurosawa ................... 347/224 |

FOREIGN PATENT DOCUMENTS

| CN | 1551612 A | 12/2004 |
| EP | 1 006 709 A2 | 6/2000 |
| EP | 1 469 668 A2 | 10/2004 |

(Continued)

OTHER PUBLICATIONS

Chinese Office Action dated Feb. 5, 2010, issued in corresponding Chinese Patent Application No. 2007-100794504.

(Continued)

*Primary Examiner*—Negussie Worku
(74) *Attorney, Agent, or Firm*—Westerman, Hattori, Daniels & Adrian, LLP

(57) ABSTRACT

A scanner device includes a function for generating image data by rotating an image scanned from an original document according to necessity. The scanner device includes a display processing unit and a confirmation accepting unit. The display processing unit displays a first image pattern indicating a set status of a scanned original document, and a second image pattern indicating a direction of image data when the original document under the set status in the first image pattern is scanned and rotated by a prescribed rotation condition. The confirmation accepting unit accepts a confirmation for executing an image data generation processing under a prescribed rotation condition.

10 Claims, 6 Drawing Sheets

FOREIGN PATENT DOCUMENTS

| | | |
|---|---|---|
| EP | 1 523 169 A1 | 4/2005 |
| JP | 02-260030 A | 10/1990 |
| JP | 6-98109 A | 4/1994 |
| JP | 7-129748 A | 5/1995 |
| JP | 08-083062 A | 3/1996 |
| JP | 2000-078394 A | 3/2000 |
| JP | 2000-341463 A | 12/2000 |
| JP | 2003-152961 A | 5/2003 |
| JP | 2003-324599 A | 11/2003 |
| JP | 2004-236161 A | 8/2004 |
| JP | 2004-320581 A | 11/2004 |
| WO | 99/48012 A1 | 9/1999 |

OTHER PUBLICATIONS

European Search Report dated Jul. 4, 2007, issued in corresponding European patent application No. 07103197.

Japanese Office Action dated Sep. 9, 2008 (mailing date), issued in corresponding Japanese Patent Application No. 2006-094250.

* cited by examiner

SCANNER CONTROL DEVICE AND SCANNER DEVICE

BACKGROUND OF THE INVENTION

1. Field of the Invention

The present invention relates to a scanner control device, which controls a scanner including a function for generating image data by rotating an image scanned from an original document according to necessity, and to a scanner device.

2. Description of the Related Art

Recently, an original document is scanned by a scanner device, and generated image data is stored and used in a Personal Computer (PC) or the like. According to a direction in which an original document is set at scanning, a direction of the generated image data is fixed. However, according to a type of a scanner device, a direction in which main scanning members are arranged, and a transportation direction of an original document, etc., the direction of the generated image data may differ from the direction in which the original document was set. As a result, there are cases in which a user cannot obtain image data in a desired direction. In such cases, the user is required to scan the original document again, or to rotate the image data by an application of a PC. For example, when the generated image data is a Portable Document Format (PDF), a paid application is necessary for rotating the image data.

According to a conventional art, a direction of an image of an original document to be scanned is set for each page, and a rotation angle is determined for providing a direction of an image of a scanned original document in a preset standard direction. Then, the image of the scanned original document is rotated by the determined rotation angle to form an output image. Accordingly, when scanning and outputting a plurality of original documents in which a direction in which characters and an image are arranged differs among the original documents, the direction in which the characters and the image are arranged in the output images can be provided in the same direction.

According to the above-described conventional art, the direction of all image data may be provided in the same direction. However, when the direction in which the original document is set and the direction of the image data to be generated differ from a direction intended by the user, the user cannot obtain the image data in the desired direction.

SUMMARY OF THE INVENTION

In order to overcome the problems described above, preferred embodiments of the present invention improve usability of a user using a scanner including a function for generating image data by rotating an image scanned from an original document according to necessity.

According to an aspect of the present invention, a scanner control device controls a scanner including a function for generating image data by rotating an image scanned from an original document according to necessity. The scanner control device includes a display processing unit, a confirmation accepting unit, and an instruction unit. The display processing unit displays a first image pattern indicating a set status of an original document set at the scanner, and a second image pattern indicating a direction of image data when the first image pattern is rotated under a prescribed rotation condition. The confirmation accepting unit accepts a confirmation for executing an image data generation processing by the scanner under the prescribed rotation condition. The instruction unit instructs the scanner to execute the image data generation processing under the prescribed rotation condition when the confirmation accepting unit accepts the confirmation.

The first image pattern may include a scanning direction of an original document and an arranged direction of the original document as the set status of the original document. According to an aspect of the present invention, when scanning an original document by the scanner including a function for generating the image data by rotating the image scanned from the original document according to necessity, an image pattern of the rotated image data is displayed. Therefore, the user can obtain image data in a desired direction. Accordingly, usability of the user is improved.

According to an aspect of the present invention, the scanner control device further includes a condition accepting unit which accepts an entry of a rotation condition of an image. The display processing unit can use the rotation condition accepted by the condition accepting unit as the prescribed rotation condition.

According to the above described scanner control device, when the user enters a rotation condition, the first image pattern and the second image pattern under the entered rotation condition are displayed. Therefore, the user can obtain the image data in the desired direction.

According to an aspect of the present invention, in the scanner control device, the display processing unit can display a plurality of combinations of a mode associated with a prescribed rotation condition, the first image pattern, and the second image pattern. The confirmation accepting unit can accept a selection of either one of modes as a confirmation for executing the image data generation processing by the scanner under the prescribed rotation condition associated with the selected mode.

According to the above-described scanner control device, the user can look at the image pattern, and instruct the scanner to execute the image data generation processing. Therefore, the user can obtain the image data in the desired direction just by looking at the displayed image pattern and selecting either one of the modes without being conscious about a rotation angle.

According to an aspect of the present invention, in the scanner control device, the display processing unit can display a plurality of first image patterns in which the set status of the original document differs for each of the first image patterns, and a plurality of second image patterns associated with the plurality of the first image patterns by associating each of the first image patterns and the second image patterns with each prescribed rotation condition.

The above-described aspects of the present invention provide either one of the above-described scanner control devices, and a scanner device including a document scanning unit which scans an original document, an image memory which stores an image scanned by the document scanning unit, and an image data generating unit which generates image data by rotating the image stored in the image memory under the prescribed rotation condition according to an instruction from the instruction unit of the scanner control device.

Further, any combinations of the above-described constituent elements and the conversions of the expression of the present invention between a method, a device, a system, a recording medium, a computer program or the like are also effective as preferred embodiments of the present invention.

According to the present invention, usability of the user can be improved when using a scanner including a function for generating image data by rotating an image scanned from an original document according to necessity.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
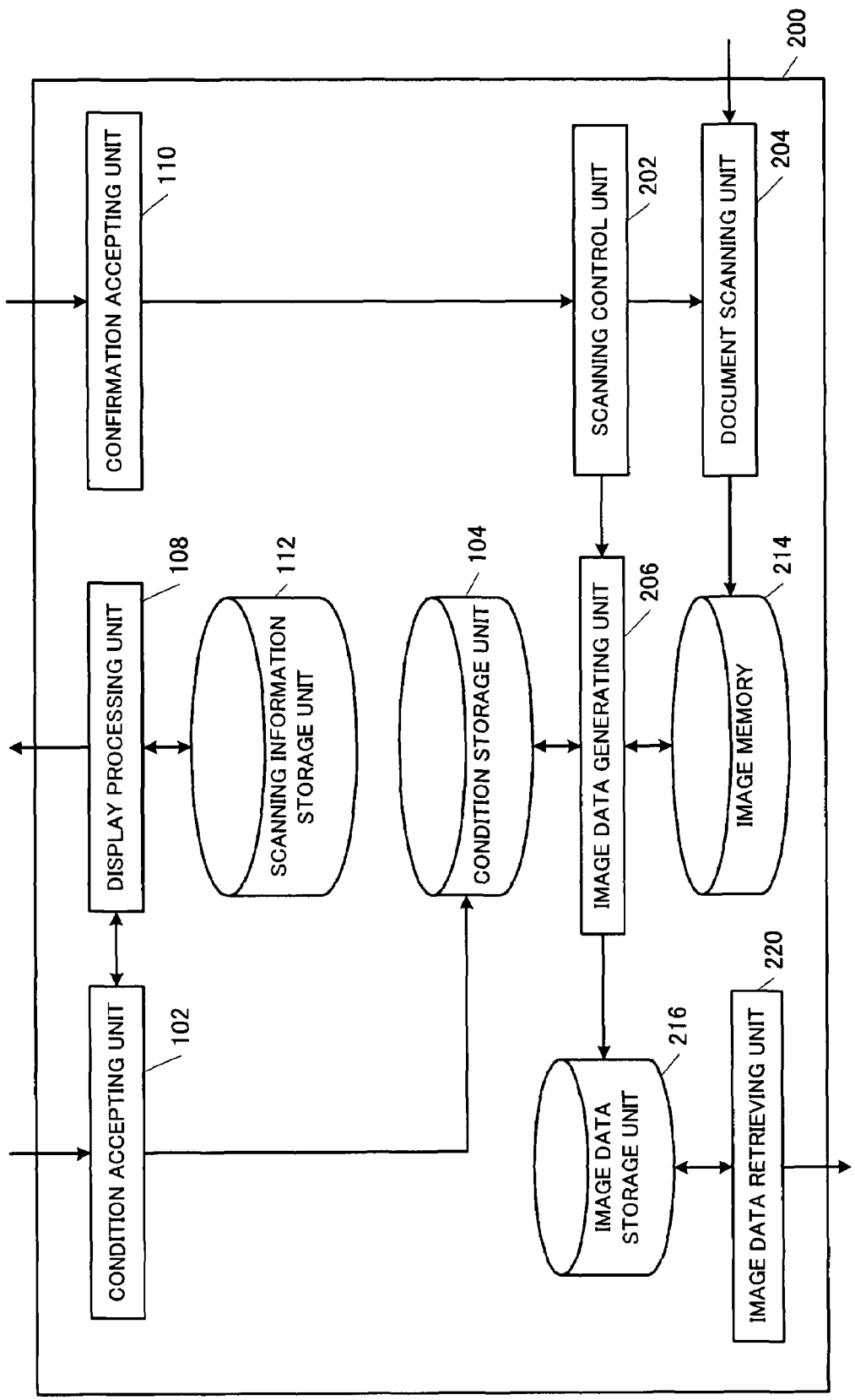
FIG. 1 is a block diagram illustrating a configuration of a scanner device according to a preferred embodiment of the present invention.

Preferred embodiments of the present invention will be described with reference to accompanying drawings. Further, in all of the drawings, like reference numerals are assigned to like constituent elements, and a description thereof will be omitted.

First Preferred Embodiment

A description will be made of an example of a configuration in which a scanner control device is included in a scanner device.

FIG. 1 is a block diagram illustrating a configuration of a scanner device 200 according to a preferred embodiment of the present invention. The scanner device 200 includes a condition accepting unit 102, a condition storage unit 104, a display processing unit 108, a confirmation accepting unit 110, a scanning information storage unit 112, a scanning control unit 202 (instruction unit), a document scanning unit 204 (scanner), an image data generating unit 206 (scanner), an image memory 214 (scanner), an image data storage unit 216 (scanner), and an image data retrieving unit 220. In the present preferred embodiment, the scanner device 200 includes a function for generating image data by rotating an image scanned from an original document according to necessity.

The condition accepting unit 102 accepts an entry of a rotation condition of an image. As one example, the condition accepting unit 102 can accept an entry of a rotation angle as a rotation condition from a user. As another example, the condition accepting unit 102 can accept a selection of a mode from a plurality of modes associated with each prescribed rotation condition. In this case, a prescribed rotation condition associated with the mode accepted by the condition accepting unit 102 is accepted as an entry of the rotation condition. For example, the condition accepting unit 102 can accept a designation of either a first mode or a second mode as a rotation condition. Further, the first mode is a mode in which an image is rotated by a prescribed rotation angle, and the second mode is a mode in which an image is not rotated. The condition accepting unit 102 stores the accepted rotation condition in the condition storage unit 104. Further, as the rotation condition, the condition accepting unit 102 can store whether or not to rotate an image, and a rotation angle when rotating the image in the condition storage unit 104.

The display processing unit 108 displays a first image pattern and a second image pattern on a display (not illustrated) of the scanner device 200. Further, the first image pattern indicates a set status of an original document set at the scanner device 200. The second image pattern indicates a direction of image data when the original document in the set status as represented by the first image pattern is scanned by the scanner device 200 and the scanned image is rotated by the rotation condition accepted by the condition accepting unit 102. The first image pattern may include a scanning direction of an original document and an arranged direction of the original document set at the scanner device 200. The second image pattern may include a direction of image data displayed on a Personal Computer (PC) or the like. For example, when an original document is set in its portrait direction at the scanner device 200, a portrait image of an original document is displayed as the first image pattern. When image data to be generated is portrait, a portrait image pattern is displayed as the second image pattern.

The scanning information storage unit 112 stores a rotation condition and a direction of image data, which is generated when the image is rotated by the scanner device 200 under the rotation condition, by associating the rotation condition with the direction of the image data. As one example, the scanning information storage unit 112 may store a calculation formula for generating the second image pattern according to the first image pattern. As another example, the scanning information storage unit 112 may also associate and store the first image pattern, the prescribed rotation condition, and the second image pattern, which is an image pattern when an image is rotated by the scanner device 200 under the prescribed rotation condition.

The display processing unit 108 refers to the scanning information storage unit 112 to display the first image pattern and the second image pattern on a display (not illustrated) of the scanner device 200. Accordingly, since an image pattern of rotated image data is displayed, the user can obtain the image data in a desired direction.

Further, before the user designates a condition from the condition accepting unit 102, the display processing unit 108 may display combinations of the first image pattern and the second image pattern, which is an image pattern when the image is rotated by the scanner device 200 under the prescribed rotation condition, on the display. Accordingly, the user can select either one of the combinations. In this case, the condition accepting unit 102 accepts a prescribed rotation condition for the combination selected by the user as a rotation condition.

The confirmation accepting unit 110 accepts a confirmation for executing the image data generation processing by the scanner device 200 under the rotation condition accepted by the condition accepting unit 102.

The document scanning unit 204 scans an original document. The image memory 214 stores an image scanned by the document scanning unit 204. For example, the image is a bitmap image.

The image data generating unit 206 encodes an image stored in the image memory 214 or the like to generate image data. For example, the image data is PDF data. The image data generating unit 206 generates image data by rotating the image stored in the image memory 214 according to necessity in accordance with the rotation condition stored in the condition storage unit 104. The image data generating unit 206 stores the generated image data in the image data storage unit 216. The image data retrieving unit 220 retries the image data stored in the image data storage unit 216.

The scanning control unit 202 controls a scanning operation of an original document of the document scanning unit 204 and an image data generation processing of the image data generating unit 206. When the confirmation accepting unit 110 accepts a confirmation for executing the image data generation processing, the scanning control unit 202 controls the document scanning unit 204 to scan an original document and then controls the image data generating unit 206 to execute the image data generation processing.

Next, one example of the present preferred embodiment will be described. The scanning information storage unit 112 associates and stores a mode, a first image pattern, and a second image pattern, which is an image pattern when an image is rotated by the scanner device 200 under the prescribed rotation condition.

Figure 2A:
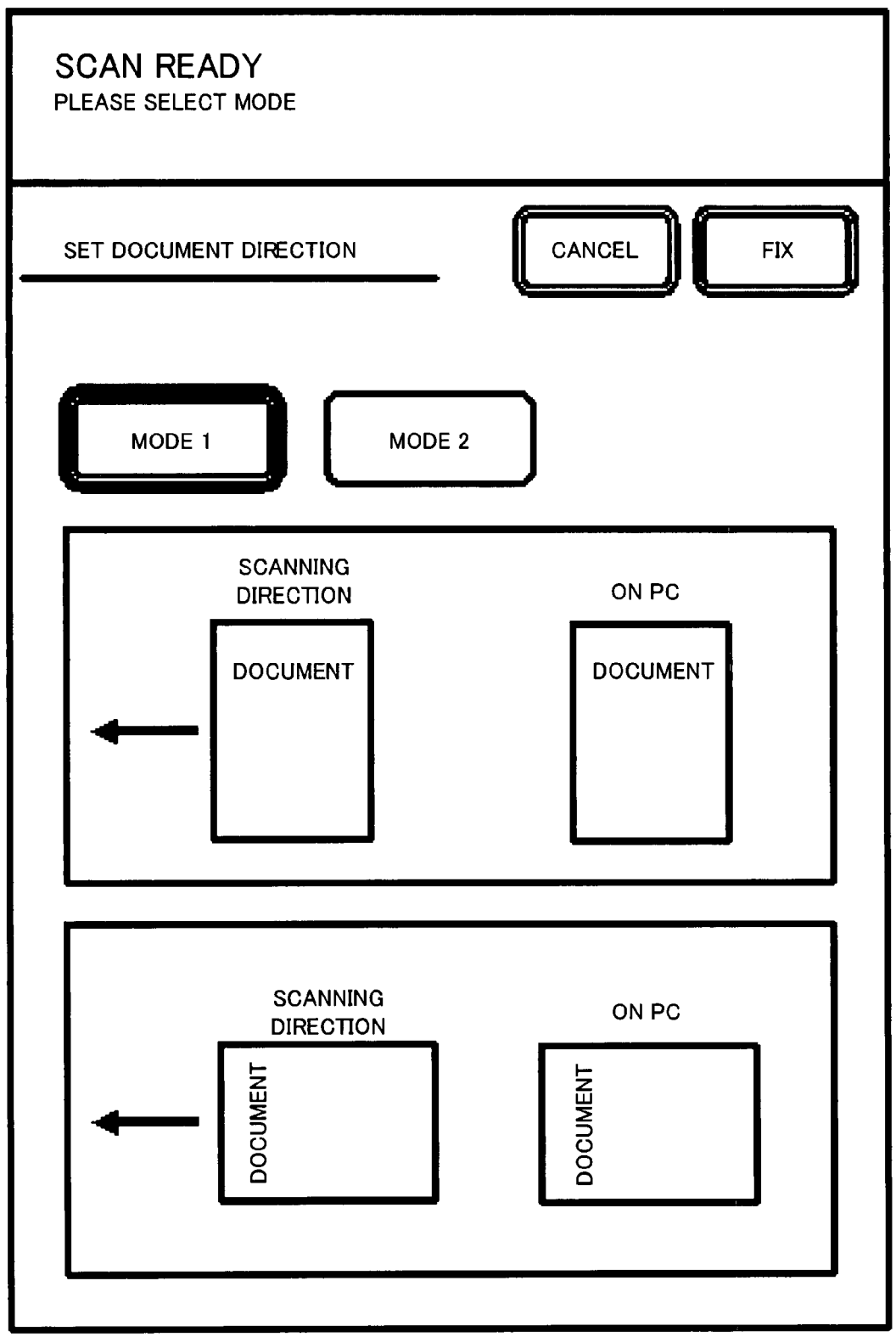
FIGS. 2A through 2C illustrate examples of a screen displayed on a display of the scanner device.
Figure 2B:
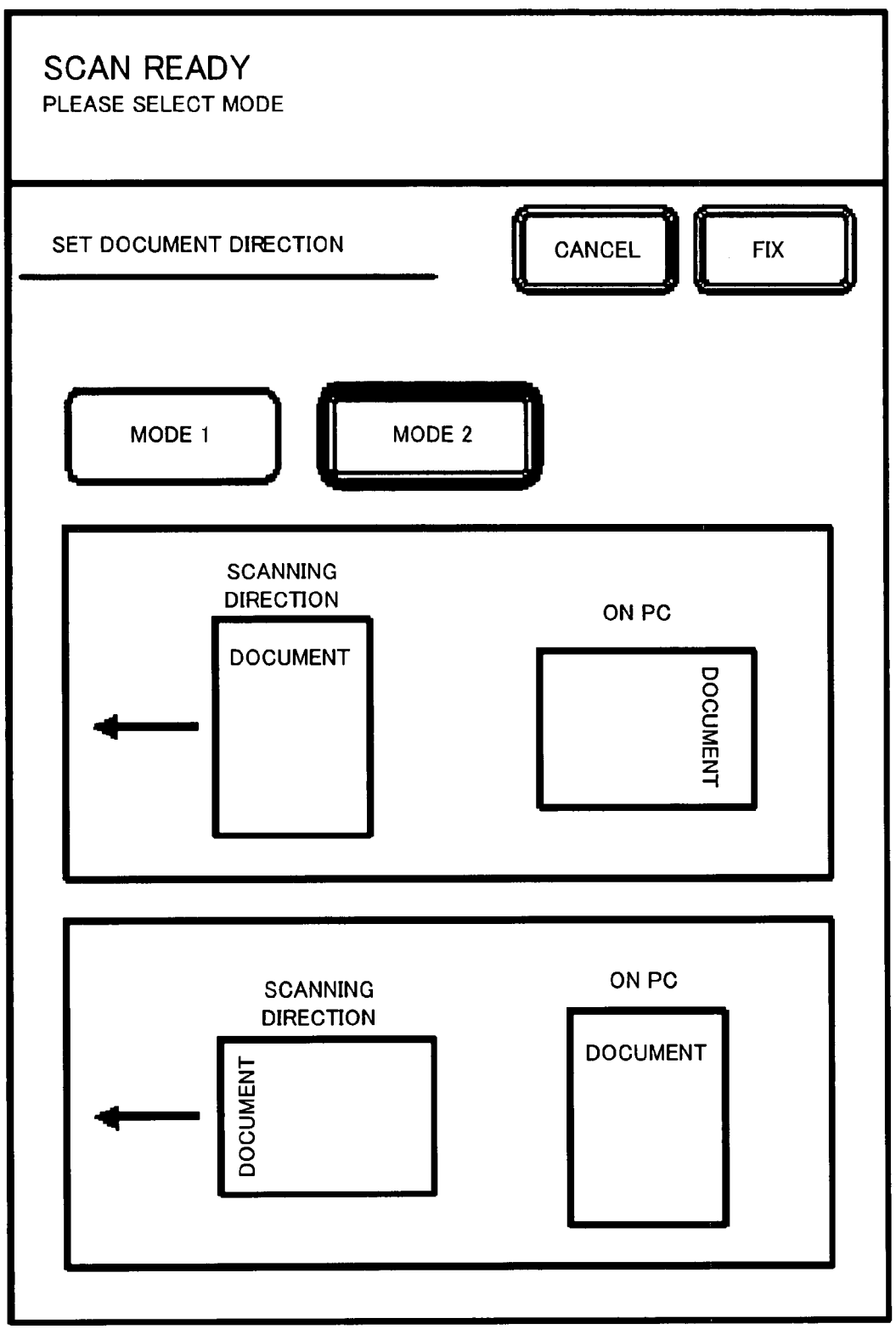
Figure 2C:
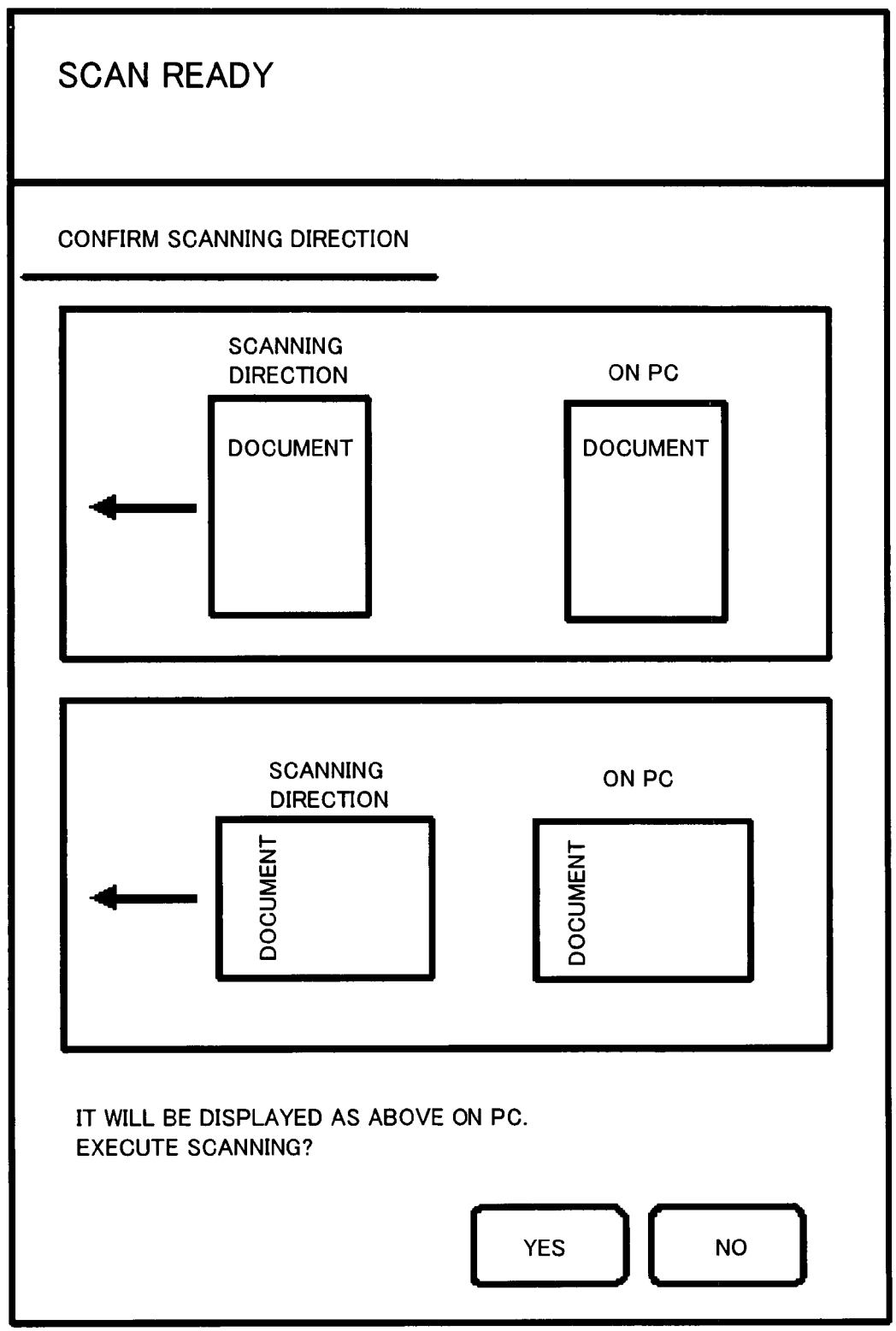

FIGS. 2A through 2C illustrate screens displayed on a display (not illustrated) by the display processing unit 108. FIG. 2A illustrates a screen including a first image pattern (scanning direction) and a second image pattern (on PC) when "mode 1" is selected. The "mode 1" is a mode in which image data is generated by rotating an image, which has been generated according to an original document scanned by the scanner device 200, 90 degrees in a leftward direction. In the example of FIG. 2A, to enable the user to easily understand, image patterns for both when the first image pattern is portrait and landscape are displayed. Second image patterns associated with the displayed first image patterns are also displayed. The scanning information storage unit 112 associates and stores the mode 1, a rotation condition that rotation is necessary and that the image data will be rotated 90 degrees in a leftward direction, the first image pattern, and the second image pattern. Since a main scanning direction of the scanner device 200 corresponds to a vertical direction of the display, the image data is required to be rotated by 90 degrees in the leftward direction for providing the main scanning direction in the vertical direction also on the PC.

FIG. 2B illustrates a screen including a first image pattern and a second image pattern when "mode 2" is selected. The "mode 2" is a mode in which image data is generated without rotating an image obtained by scanning the original document by the scanner device 200. To enable the user to easily understand, image patterns for both when the first image pattern is portrait and landscape are displayed. The second image pattern corresponding to the displayed first image patterns are also displayed. The scanning information storage unit 112 associates and stores the mode 2, a rotation condition that a rotation angle is zero degree (that rotation is unnecessary), the first image patterns and the second image patterns. In this case, since the main scanning direction at scanning corresponds to a horizontal direction on the PC, rotation is unnecessary.

When the user presses "FIX" on the screen illustrated in FIG. 2A, the condition accepting unit 102 accepts the mode 1 as the instruction of the user. In this case, the display processing unit 108 displays a confirmation screen illustrated in FIG. 2C. When the user selects "YES" in the screen illustrated in FIG. 2C, the confirmation accepting unit 110 accepts as a confirmation of the user.

Accordingly, without requiring the user to be conscious about the rotation angle, the scanner device 200 can generate image data in a desired direction. As described above, when the user instructs a scanning operation of an original document, the first image pattern and the second image pattern are displayed. As a result, the user can obtain the image data in the desired direction.

Figure 3:
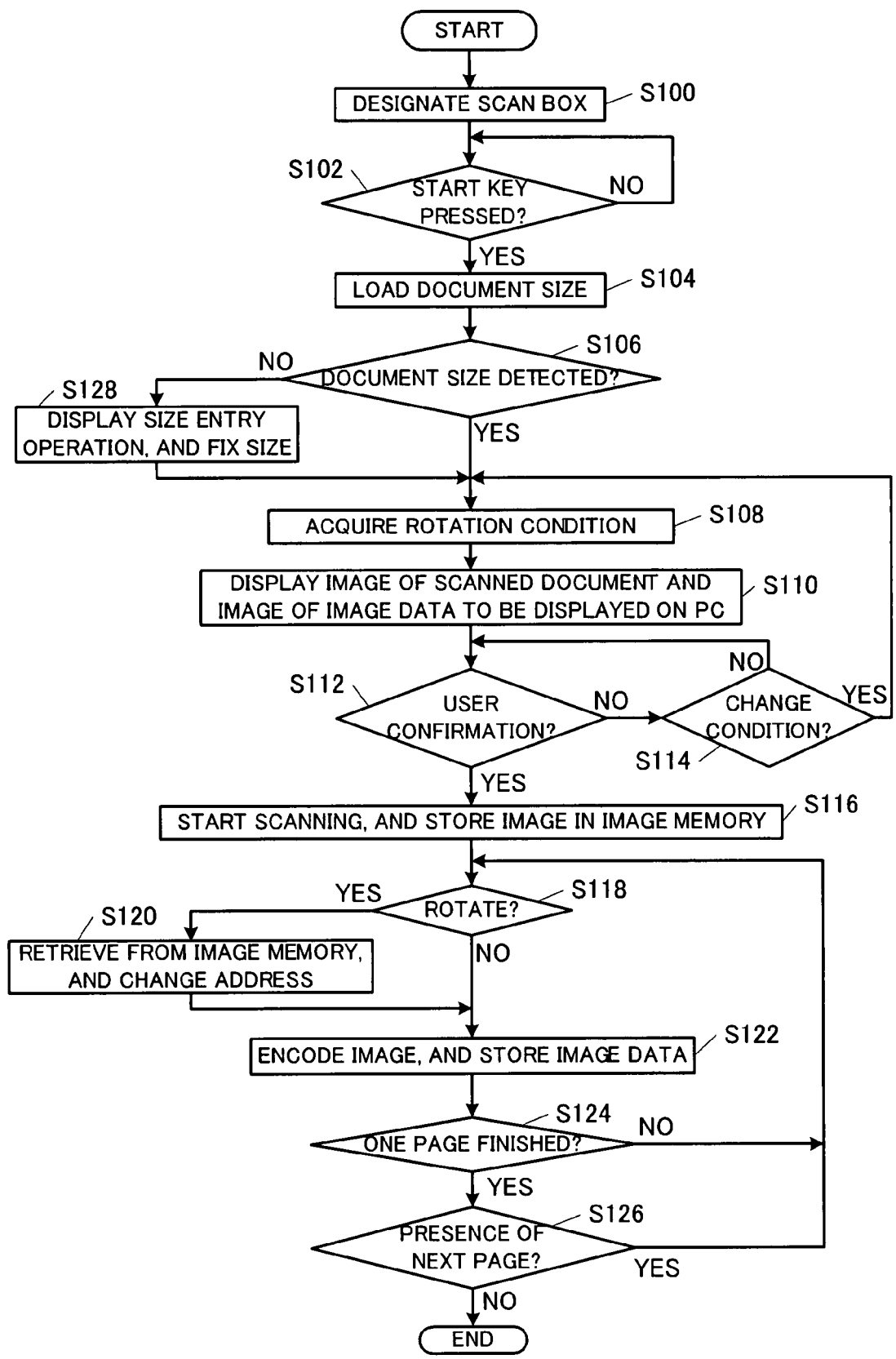
FIG. 3 is a flowchart illustrating a processing procedure of the scanner device according to a preferred embodiment of the present invention.

FIG. 3 is a flowchart illustrating a processing procedure of the scanner device 200 according to the present preferred embodiment. When the user designates a scan box, a scan box is displayed on the display of the scanner device 200 (step S100). When the user presses a start key (not illustrated) (step S102: YES), the document scanning unit 204 loads a document size (step S104). When the document scanning unit 204 detects a document size (step S106: YES), a preparation for starting a scanning operation is completed.

After the preparation for starting the scanning operation is completed or in parallel with the preparation for starting the scanning operation, the condition accepting unit 102 accepts a rotation condition of an image for the scanner device 200. In the present preferred embodiment, the condition accepting unit 102 accepts a designation of whether to rotate an image (mode 1) or not rotate an image (mode 2). The rotation condition accepted by the condition accepting unit 102 is stored in the condition storage unit 104 (step S108). Next, the display processing unit 108 displays a confirmation screen including a first image pattern and a second image pattern associated with the rotation condition accepted by the condition accepting unit 102 (step S110).

Next, when the confirmation accepting unit 110 accepts a confirmation from the user (step S112: YES), the scanning control unit 202 controls the document scanning unit 204 to start a scanning operation of the original document. The document scanning unit 204 scans the original document, and stores the image in the image memory 214 (step S116).

The image data generating unit 206 refers to the condition storage unit 104 and determines whether or not it is necessary to rotate the image (step S118). When the image is necessary to be rotated (step S118: YES), the image data generating unit 206 retrieves the image from the image memory 214, and carries out an address conversion according to the rotation condition (step S120). After step S120 or when the image is not necessary to be rotated (step S118: NO), the image data generating unit 206 encodes the image and generates image data, and the generated image data is stored in the image data storage unit 216 (step S122).

The scanner device 200 repeats the processing from step S118 through step S122 until data of one page is finished. When data of one page is finished (step S124: YES), a determination is carried out as to a presence or an absence of a next page (step S126). Until the processing is completed for all pages, the above-described processing is repeated.

Second Preferred Embodiment

Figure 4:
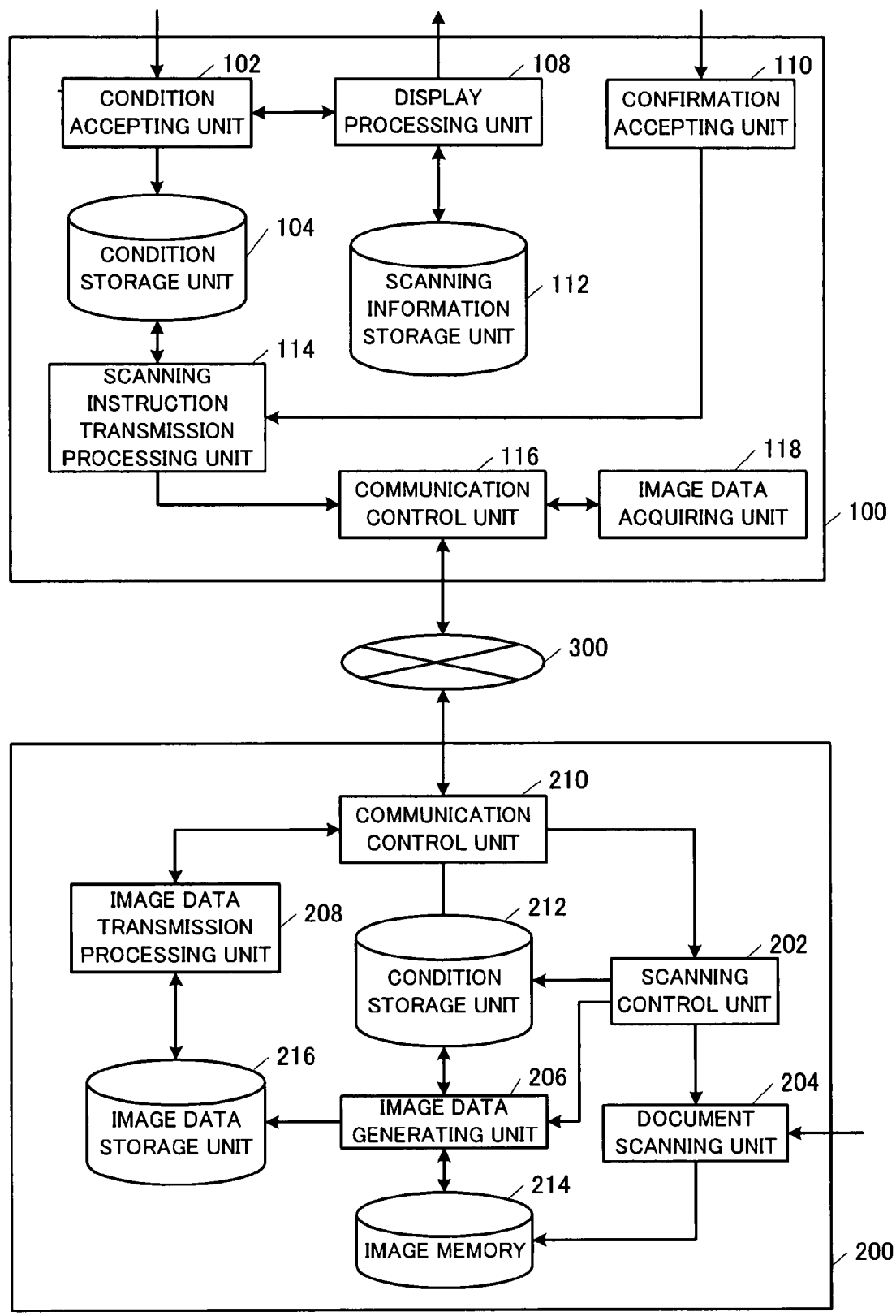
FIG. 4 is a block diagram illustrating a configuration of a scanner control device and a scanner device according to a preferred embodiment of the present invention.

FIG. 4 is a block diagram illustrating a configuration of the scanner control device 100 according to a second preferred embodiment of the present invention. In the second preferred embodiment, a scanner control device 100 may be a PC. The scanner control device 100 can be constituted by a PC storing a program for controlling a scanner including a function for generating image data by rotating an image scanned from an original document according to necessity. The program controls the PC to function as a display processing unit, a confirmation accepting unit, and an instruction unit. Further, the display processing unit displays a first pattern indicating a set status of an original document at a scanner, and a second image pattern indicating a direction of image data when the original document in the set status represented by the first image pattern is scanned by the scanner and rotated under a prescribed rotation condition. The confirmation accepting unit accepts a confirmation for executing an image data generation processing by the scanner under the prescribed rotation condition. The instruction unit instructs the scanner to execute the image data generation processing under the prescribed rotation condition when the confirmation accepting unit accepts the confirmation.

The scanner control device 100 includes a condition accepting unit 102, a condition storage unit 104, a display processing unit 108, a confirmation accepting unit 110, a scanning information storage unit 112, a scanning instruction transmission processing unit 114, a communication control unit 116, and an image data acquiring unit 118.

The scanner control device 100 controls the scanner device 200 via a network 300. For example, the network 300 is a LAN.

The communication control unit 116 transmits and receives data to and from the scanner device 200 via the network 300. When the confirmation accepting unit 110 accepts a confirmation from the user, the scanning instruction transmission processing unit 114 refers the condition storage unit 104 to retrieve a rotation condition, and transmits the rotation condition and a scanning instruction for the original document to the scanner device 200 via the communication control unit 116. The image data acquiring unit 118 acquires the image data generated by the scanner device 200 from the scanner device 200.

In the present preferred embodiment, the scanner device 200 includes a scanning control unit 202, a document scanning unit 204, an image data generating unit 206, an image data transmission processing unit 208, a communication control unit 210, a condition storage unit 212, an image memory 214, and an image data storage unit 216.

The communication control unit 210 transmits and receives data to and from the scanner control device 100 via the network 300. The scanning control unit 202 accepts a document scanning instruction and a rotation condition from the scanner control device 100. The scanning control unit 202 stores the rotation condition accepted from the scanner control device 100 in the condition storage unit 212. When receiving a transmission instruction of the image data from the image data acquiring unit 118 of the scanner control device 100, the image data transmission processing unit 208 retrieves the image data from the image data storage unit 216, and transmits the image data to the scanner control device 100 via the communication control unit 210.

In FIG. 1 and FIG. 4, elements that are unrelated to the subject matter of the present invention are not illustrated. For example, a printing processing unit or the like is not illustrated. Each of constituent elements of the scanner device 200 and the scanner control device 100 illustrated in FIG. 1 and FIG. 4 represent blocks of units of function, instead of units of hardware. Each constituent element of the scanner device 200 and the scanner control device 100 is realized primarily by any combination of a Central Processing Unit (CPU) of any computer, a memory, a computer program which realizes the constituent elements illustrated in FIG. 1 and FIG. 4 loaded to the memory, a storage unit such as a hard disk drive which stores the computer program, and an interface for establishing a connection with a network. It is understood by those skilled in the art that various changes and modifications can be made for methods and devices for realizing each of the constituent elements.

Preferred embodiments of the present invention have been described with reference to the drawings. The above-described preferred embodiments are just some of the example of the present invention, and other various modifications may be made.

For example, the scanner device 200 may be a network facsimile machine and a Multi Function Peripheral (MFP) or the like including a facsimile transmitting and receiving function, a scanner function, a printer function and a document management function or the like.

The display processing unit 108 can display the first image pattern and the second image pattern for when an original document is set at an Automatic Document Feeder (ADF) and when an original document is set on a Flat Bed Scanner (FBS). The scanning information storage unit 112 stores information for displaying such information by the display processing unit 108. When the scanner device 200 includes a detector for detecting a set status of the original document, the display processing unit 108 can display a corresponding image pattern according to how an original document is set.

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A scanner control device, which controls a scanner device including a function for generating image data by rotating an image scanned from an original document according to necessity, the scanner control device comprising:

a display processing unit arranged to concurrently display a first image pattern indicating an arranged direction of an original document set at the scanner device, and a second image pattern indicating a direction of image data resulting when the original document in the arranged direction indicated by the first image pattern is scanned by the scanner device and the scanned image is rotated by a prescribed rotation condition;

a confirmation accepting unit arranged to accept a confirmation for executing an image data generation processing by the scanner device under the prescribed rotation condition; and an instruction unit arranged to instruct the scanner device to execute the image data generation processing under the prescribed rotation condition when the confirmation accepting unit accepts the confirmation.

2. The scanner control device according to claim 1, further comprising a condition accepting unit arranged to accept an entry of a rotation condition of an image;

wherein the display processing unit uses the rotation condition accepted by the condition accepting unit as the prescribed rotation condition.

3. The scanner control device according to claim 2, wherein said first image pattern includes a plurality of first image patterns each representing a different arranged direction of the original document and said second image pattern includes a plurality of second image patterns respectively corresponding to the plurality of first image patterns, and each second image pattern indicating a direction of the image data when the original document in the arranged direction indicated by the corresponding first image pattern is scanned by the scanner device and rotated by a prescribed rotation condition, and the display processing unit associates and displays the plurality of the first image patterns and the plurality of the second image patterns respectively corresponding to the plurality of the first image patterns.

4. The scanner control device according to claim 1, wherein the display processing unit can display a plurality of combinations of a mode associated with the prescribed rotation condition, the first image pattern and the second image pattern, and the confirmation accepting unit accepts a selection of one mode as the confirmation for executing the image data generation processing by the scanner device under the prescribed rotation condition associated with the selected mode.

5. The scanner control device according to claim 4, wherein said first image pattern includes a plurality of first image patterns each representing a different arranged direction of the original document and said second image pattern includes a plurality of second image patterns respectively corresponding to the plurality of first image patterns, and each second image pattern indicating a direction of the image data when the original document in the arranged direction indicated by the corresponding first image pattern is scanned by the scanner device and rotated by a prescribed rotation condition, and the display processing unit associates and displays the plurality of the first image patterns and the plurality of the second image patterns respectively corresponding to the plurality of the first image patterns.

6. The scanner control device according to claim 1, wherein said first image pattern includes a plurality of first image patterns each representing a different arranged direction of the original document and said second image pattern includes a plurality of second image patterns respectively corresponding to the plurality of first image patterns, and each second image pattern indicating a direction of the image data when the original document in the arranged direction indicated by the corresponding first image pattern is scanned by the scanner device and rotated by a prescribed rotation condition, and the display processing unit associates and displays the plurality of the first image patterns and the plurality of the second image patterns respectively corresponding to the plurality of the first image patterns.

7. A scanner device comprising:
a document scanning unit arranged to scan the original document;
an image memory arranged to store an image scanned by the document scanning unit;
an image data generating unit arranged to generate image data by rotating the image stored in the image memory under the prescribed rotation condition according to an instruction of the instruction unit of the scanner control device; and
a scanner control device including:
a display processing unit arranged to concurrently display a first image pattern indicating an arranged direction of an original document set at the document scanning unit, and a second image pattern indicating a direction of image data resulting when the original document in the arranged direction indicated by the first image pattern is scanned by the scanner device and the scanned image is rotated by a prescribed rotation condition,
a confirmation accepting unit arranged to accept a confirmation for executing an image data generation processing under the prescribed rotation condition, and
an instruction unit arranged to instruct to execute the image data generation processing under the prescribed rotation condition when the confirmation accepting unit accepts the confirmation.

8. The scanner device according to claim 7, further comprising a condition accepting unit arranged to accept an entry of a rotation condition of an image;
wherein the display processing unit uses the rotation condition accepted by the condition accepting unit as the prescribed rotation condition.

9. The scanner device according to claim 7, wherein the display processing unit can display a plurality of combinations of a mode associated with the prescribed rotation condition, the first image pattern and the second image pattern, and the confirmation accepting unit accepts a selection of one mode as the confirmation for executing the image data generation processing under the prescribed rotation condition associated with the selected mode.

10. A computer readable storage medium storing a computer program for controlling a scanner including a function for generating image data by rotating an image scanned from an original document according to necessity, wherein execution of the stored computer program causes a computer to function as means for concurrently displaying a first image pattern indicating an arranged direction of an original document set at the scanner, and a second image pattern indicating a direction of image data resulting when the original document in the arranged direction indicated by the first image pattern is scanned by the scanner device and the scanned image is rotated by a prescribed rotation condition, means for accepting a confirmation for executing an image data generation processing by the scanner under the prescribed rotation condition, and means for instructing the scanner to execute the image data generation processing under the prescribed rotation condition when the means for accepting accepts the confirmation.

* * * * *